July 23, 1946.  F. M. RODDY  2,404,406

PROCESS FOR PLASTICIZING OR PLASTICATING PLASTIC MATERIALS

Filed March 3, 1942

INVENTOR
FRED M. RODDY
BY
W Russell Greenwood
ATTORNEY

Patented July 23, 1946

2,404,406

UNITED STATES PATENT OFFICE 2,404,406

PROCESS FOR PLASTICIZING OR PLASTICATING PLASTIC MATERIALS

Fred M. Roddy, Providence, R. I.

Application March 3, 1942, Serial No. 433,118

1 Claim. (Cl. 18—48)

This invention relates to a method for plasticizing or plasticating plastic compounds, and more particularly to plasticizing various kinds of thermoplastic molding materials that are employed in the plastics industry. By thermoplastic molding materials is meant those materials which soften and can be made to flow under the action of heat and pressure without regard to any subsequent reaction which may alter its plastic properties. It is accordingly one object of my invention to provide a process which will be capable of plasticizing the above-mentioned materials at a much more rapid rate than is the case with present equipment and also to accomplish the heating in a shorter time with less consequent injury to the material being processed.

Another object of the invention is to provide a continuous process thereby insuring a more uniform quality of product and also lessening the cost of the manufacturing operation.

It is to be pointed out that plastic materials of this class in either the powdered or granular form are poor conductors of heat and because of this it is difficult to bring these materials to a plastic state by contact heating as is carried out in the present types of rubber-type mills and other kneading machines used for plasticating plastic compounds. Once the material has become softened or slightly plastic, however, its heat conductivity increases and it is less difficult to add further heat to the material by the contact method.

With the foregoing principle in mind, another object of the invention is to provide a means of injecting the cold plastic compounds in powdered or granular form into a moving stream of previously plasticized material, and then causing this stream of material, consisting partially of plastic material and partially of the powdered or granular material which has been injected into the stream, to flow through passages of the system wherein additional heat is added to the material so that the aforesaid particles of powdered or granular material will become thoroughly mixed and plasticized in the turbulently flowing stream and form a homogeneous mass of plasticized material.

It is to be explained that the cold powdered or granular material above referred to is either of the inherently thermoplastic type as methyl methacrylate or of materials, such as cellulose acetate, that are made thermoplastic by the addition of suitable liquid plasticizers. When cellulose acetate is used in this application the dry cellulose acetate will have been previously mixed with a liquid plasticizer but the solid cellulose acetate material will predominate and the resulting mixture will merely be moist or damp and therefore capable of being fed into the plasticating system by the type of injector mechanism hereinafter disclosed.

A further object of my invention is to provide a method whereby a portion of the heat required to plasticate the material is added to the material by means of the friction generated within the turbulently flowing material as it passes through various conduits and strictures in the mechanism of the system.

The more fundamental aspect of the invention is the method of injecting the cold powdered or granular material into a flowing stream of plastic material which has previously been plasticized, and thereafter pumping and circulating this material through certain heated paths and passages wherein the particles of the powdered or granular material become thoroughly mixed with the plastic mass in the flowing stream and themselves become quickly plasticated. Once the cold powdered or granular material has been injected into the stream of flowing plastic material there will obviously be numerous embodiments and ramifications that the mechanism employed in the process may take.

In the apparatus which I employ for carrying out my invention, the powdered or granular material is stored in the hopper of a plunger type injector mechanism. Two plungers are provided and it is intended that they be operated alternately in such a manner that at all times one of the plungers tends to force cold granular material into the plasticating system. The injector plungers force the said cold powdered or granular material into the circuit of a flowing plastic stream which picks up these injected particles and carries them along with the stream of flowing material. This stream then is led to a pump, preferably of the high pressure streamline flow type capable of producing flow pressures of the order of from ten thousand to thirty thousand pounds per square inch. Such a pump is described in my co-pending application Serial No. 439,634, filed April 20, 1942. The material is pumped through a conduit which branches into two circuits, the one circuit leading to a second pump preferably of the type just described, and the other conduit serving as a by-pass which leads a portion of the material past the connections with the injector mechanism where the flowing stream from the said by-pass circuit again picks up additional cold powdered or granular material which is again carried along by the stream to the first mentioned pump. The first pump unit of the system will be hereinafter referred to as the circulating pump and the second pump unit hereinafter referred to as the metering pump. The flowing material which by the time it has reached the metering pump has become quite hot and soft, is pumped from the metering pump through a suitable cooling unit wherein it is cooled to a state of plasticity suitable for extruding and thence the material is led to an extruding die located in the top of a vertical stack or cabinet. At the extrusion die, the material is formed into strands which are cooled and become hardened as they are led downwardly through the stack or cabinet which is cooled by circulating air or other means. From the cooling cabinet, the hardened strands are shown being led into a chopping device which cuts the strands into short lengths providing a material in the form of pellets which may be used as a molding compound.

In the apparatus just described the circulating system is heated by jacketing or by other heating means. The injector mechanism is cooled by circulating a cooling medium through jackets on the injector cylinders. Cooling of the injector mechanism is provided to prevent this mechanism from becoming hot by heat conducted from the rest of the system. Should the injector mechanism become hot, the powdered or granular material contacting this mechanism would plasticize and stick to the metallic parts of the mechanism causing choking and interference with the feeding of the injector mechanism.

The passages of the system particularly the by-pass should be of such cross-section that the speed of flow of material through these said passages will be comparatively high so as to cause turbulence and mixing of the material.

It is desirable also that the volume of material passing through the by-pass system should be large in proportion to the amount of powdered or granular material that is forced into the system by means of the injector device. If only a small percentage of cold powdered or granular material is picked up by the stream as it passes the injector mechanism, the plasticizing of these particles will be made easy. Also, the fact that only a small percentage of cold powdered or granular material is picked up by the flowing stream as it passes the injector mechanism, means that on the average each particle of material that is withdrawn from the system in the final product has been circulated through the by-pass system a large number of times. This rapid circulation of the plastic material through the by-pass system provides an efficient means of applying heat to the plastic material; first, because the heat transfer from metallic surfaces to plastic material is greater if the material is moving or flowing rapidly than is the case when slow movement or no movement at all takes place between the plastic material and its contacting surface; second, because heat is generated by the friction of the flowing material as it moves through the passages, and third, because each small particle of the cold material injected into the stream of plastic material becomes surrounded by the hot plastic material and intimately mixed with it. The third reason above mentioned covers a principle which to my knowledge has not heretofore been applied in plasticating systems used to plasticate plastic compounds.

The cooling unit employed to cool the hot plasticized material to a state of viscosity more suitable for extrusion may be located either before or after the metering pump. The desirable location that would be selected in practice, however, would depend on the nature and viscosity of the materials being processed.

While the apparatus above described in general illustrates the manufacture of thermoplastic molding materials, it is pointed out that the material drawn from the plasticating system may be taken directly to and employed in a fashioning or fabricating operation, such as the extrusion of strands, rods, sheets, or a molding operation for producing molded articles. The operations are simplified if the material is led directly from the plasticating system to the fashioning or fabricating means. In practice, however, it is often advantageous to mix the plastic compounds with suitable plasticizers and dyes, subject this mixture of material to the plasticating process and afterwards form the material into pellets or granules which are later to be replasticized and used in fashioning operations as extrusion or injection molding. When very large volume of material is involved, it may be to advantage to take the material directly from the plasticating process to the fashioning operation thereby eliminating the necessity for replasticizing the material.

Referring to the drawing which illustrates several forms of the invention,

Figure 1:
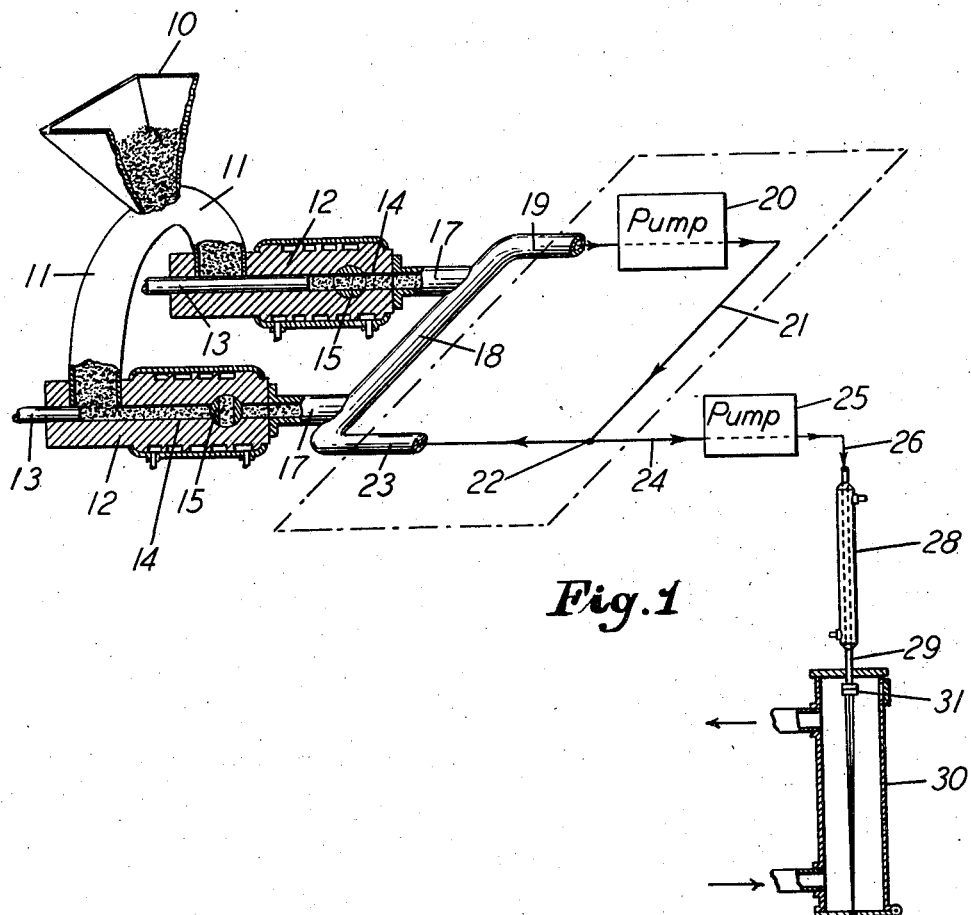
Fig. 1 is a diagrammatic view of one form of practicing the invention.

Referring now to the drawing, and more particularly to Fig. 1, a supply hopper 10 is shown in which powdered or granular material is stored. From the hopper 10 and via conduits 11 the material is fed into an injector mechanism which is represented schematically in this figure and comprises a pair of jacketed cylinders 12, cooled by the circulation of a suitable cooling medium, and the material to be processed is fed alternately to the heated conduit 18, heated by suitable jacketing (not shown), by the plungers 13 which force the material through the bores 14 of the cylinders. Valves 15 are provided in the bores 14, and suitable mechanism (not shown) associated with the plunger actuating apparatus effects the opening of these valves during the forward or injecting stroke of a plunger and the closing of the valves during the rearward or charging stroke of the plungers. From the bores 14 the powdered or granulated material is forced thence through the conduits 17 into the lines 18 and 19 leading to the pump 20. From the exit of the pump 20 the pumped material passes via pipe 21 to a junction point indicated at 22 where the pumped stream of material becomes divided with part of the pumped material flowing through the by-pass conduit 23 which communicates with the line 18 at a point near the exit from one of the injector mechanisms; and with the remainder of the pumped material being forced through conduit 24 to the pump 25. Pump 25 forces the material through conduit 26 to the cooling unit 28 and thence through conduit 29 to the extrusion die 31 at which point the material is extruded into strands which are cooled in the vertical stack or cabinet 30. From this cabinet the hardened strands are then led to the cutting machine 35 which chops the strands into bodies 40 of suitable length or of practical size. The cooling unit 28 may be located either before or after the metering pump 25 or in certain instances the cooling unit 28 may be dispensed with. The purpose of the cooling unit 28 is to cool the material to a state of viscosity where it will be about as viscous as it is possible to extrude or fashion the material.

It is to be explained that the pump 20 should preferably have capacity for pumping a large volume as compared with the amount of material that is actually taken off from the system through the line 24 into the pump 25. It will be seen, then, that much more material will pass through the by-pass conduit 23 and the conduits 18 and 19 than is actually delivered from the system itself through the line 24, and the subsequent pieces of apparatus. From this it will be observed that the percentage of powdered or granular material that is forced into the flowing mass of material in the conduits 18 and 19 by means of the plunger 13 of the injector mechanisms is small in proportion to the total mass of material that is being recirculated by means of the pump 20. This will permit the plastic stream of material to quickly plasticize the relatively small percentage of unplasticized material that is injected into it. Also mixing of the material will be quite complete as on the average each particle of material that is led off through the line 24 will have passed through the by-pass conduits 23, 18 and 19 and through the pump 20 several times.

It is to be explained that the conduit lines 18, 19, 21 and 23 are provided with suitable jacketing (not shown) and heat will be applied to such jacketed elements through which the material flows and to the various items of equipment as the material leaves the cylinders 12 of the injection units. These various pieces of equipment preferably should be so designed that they hold a comparatively small volume of material. This will mean that after the material leaves both injection mechanisms it will become quickly plasticized and will not remain in the system long before it is taken from the system either in the fashioned form or in strands which are hardened by cooling and chopped into particles which will subsequently be used in a fashioning operation such as injection molding into objects or extrusion into strands or rods.

An illustrative example of when it might be desirable to chop the material into small particles as it leaves the process rather than carry out the fashioning operation at this time would be that of a materials manufacturer who supplies thermoplastic molding materials to various fabricators throughout the country. To take a specific example, consider that the material involved is cellulose acetate. The materials manufacturer will mix cellulose acetate flake or powdered material with a suitable liquid plasticizer and also with suitable dyes for coloring the material, and introduce this material into the supply hopper 10 of the injector apparatus illustrated. Conceivably the cellulose acetate mixed with the plasticizer and coloring material might be shipped to the various fabricators in this form. However, the material is bulky and shipping it is both inconvenient and costly. Also, the material would be more difficult to handle at the fabricator's plant and would be more subject to becoming contaminated with dirt or foreign matter. The fabricator might again use the process of my invention for the fashioning operation using as raw material the plasticized and colored material in the form of pellets which come from the material supplier's cutting machine at the end of his process.

As to the purpose of the cooling unit 28, it will often be necessary to heat the material quite hot in order to thoroughly plasticize it and the material may reach a state of plasticity too soft to extrude well. Thus, the material flowing through the line 26 might need subsequent cooling to bring it to the desired state of plasticity for extrusion. Also, if the material is extruded in too hot a form too much plasticizer might be lost at the point of extrusion.

Figure 2:
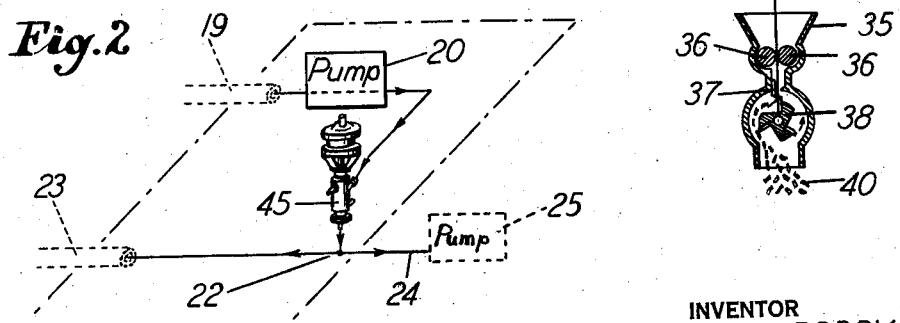
Fig. 2 is a schematic view of a slightly different arrangement which may be substituted for a part of the system shown in Fig. 1 and forming another form of practicing my invention.

As another embodiment of this invention the pressure dissipation valve 45, shown in the dot and dash quadrilateral in Fig. 2, might be introduced into the conduit 21 of the plasticating system in the position depicted in Fig. 2 when this alternative arrangement is substituted for the flow circuit of the plasticating system bounded by the dot and dash quadrilateral shown in Fig. 1. The construction and function of this pressure dissipation valve is more fully described in my co-pending application, Serial No. 431,972, filed February 23, 1942, entitled "Method for dissolving organic solids with an organic liquid."

In brief, the pressure dissipation valve 45 will serve the purpose of effecting disintegration and complete solution of all undissolved solid particles of thermoplastic material with the plasticizer by means of the combined effect of the violent turbulence produced and the great heat generated within the material as terrific pressure is dissipated in a restricted region, orifice or stricture in the said valve as the material is forced therethrough while the amount of pressure dissipated is controlled in a suitable manner.

From the foregoing it will be seen that I have provided a new and efficient means of plasticating plastic compounds, that this process makes it necessary to subject the materials to high temperature for a much shorter period of time than has been required by previously known methods of plasticating such materials, thereby being less "heat rough" on the material, and it is to be noted also that the process is continuous affording greater uniformity of the product.

I claim:

A continuous process for plasticizing discrete, dry, solid particles of a thermoplastic material having poor heat conductivity when in a dry solid state and having increased heat conductivity when in a highly heated plastic state, which process comprises continuously circulating a stream of the said thermoplastic material in a highly heated, semi-molten, plastic condition through a restricted passageway at a velocity sufficient to produce turbulent flow, continuously adding heat to said stream, continuously withdrawing a minor quantity of material from said stream at one point, maintaining said quantity substantially constant irrespective of variations in the viscosity of the material which may occur due to variations in the temperature of the material, and continuously forcing into said stream, at a point remote from said point of withdrawal, a quantity of unheated, discrete, dry, solid particles of said thermoplastic material equal in volume to the said quantity of material withdrawn from the stream.

FRED M. RODDY,